June 27, 1944.　　　　T. JORDAN　　　　2,352,204
AUTOMATIC SAMPLE CUTTING MACHINE
Filed Dec. 31, 1940　　　　2 Sheets-Sheet 2
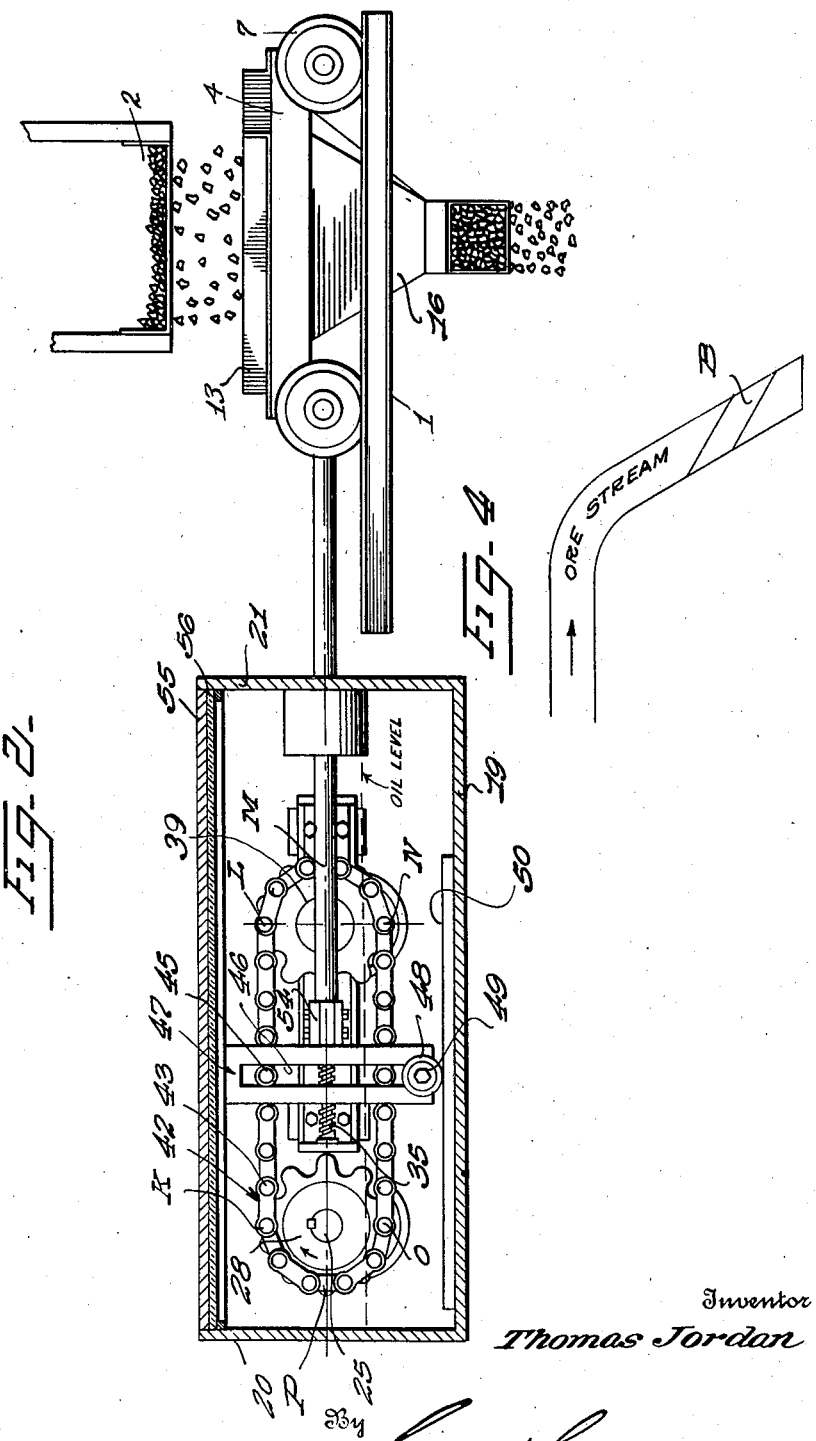
Inventor
Thomas Jordan
By Lacey & Lacey, Attorneys Patented June 27, 1944

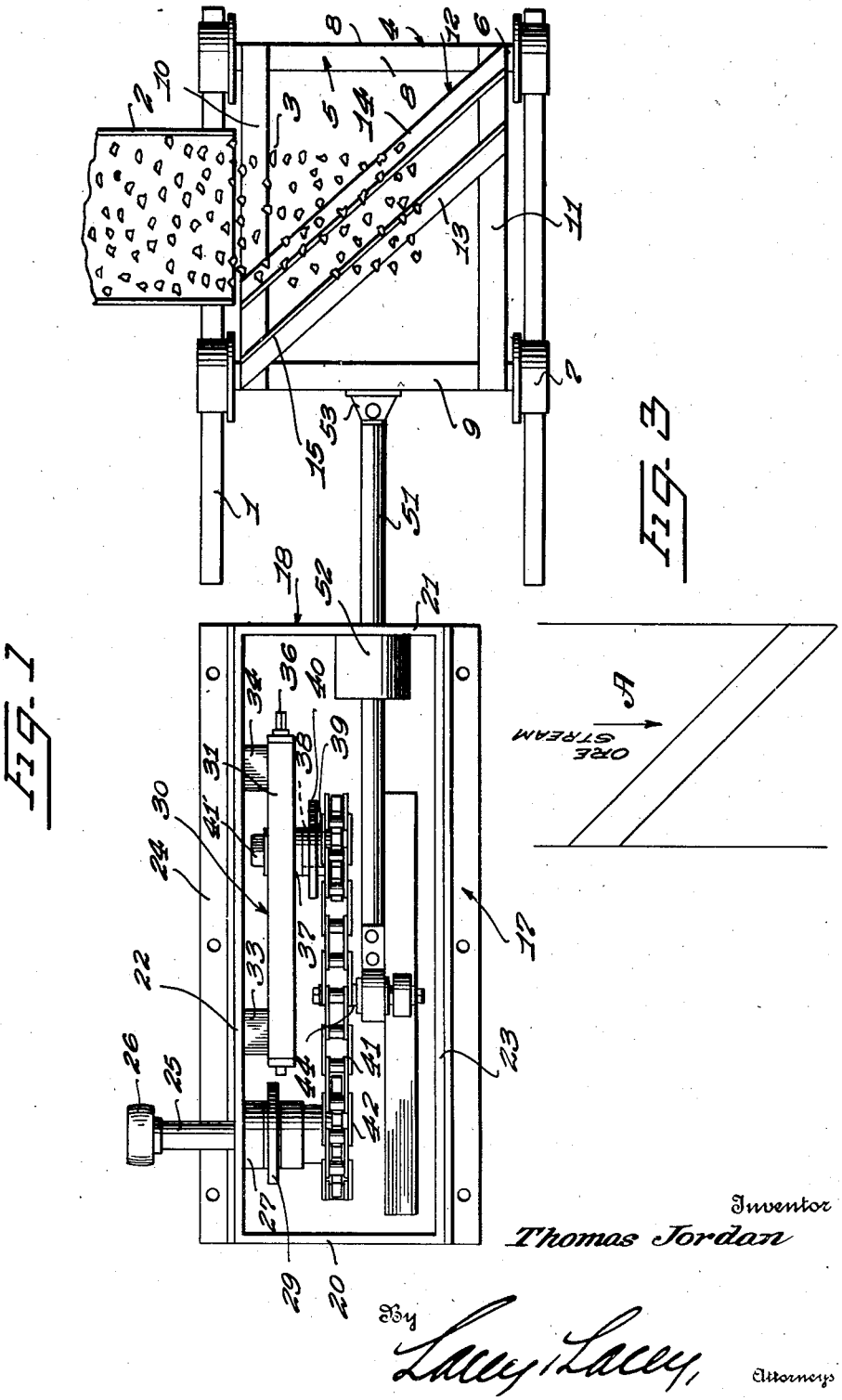

2,352,204

UNITED STATES PATENT OFFICE 2,352,204

AUTOMATIC SAMPLE CUTTING MACHINE

Thomas Jordan, Salt Lake City, Utah

Application December 31, 1940, Serial No. 372,653

5 Claims. (Cl. 73—21)

This invention relates to an improved automatic sample cutting machine and seeks, among other objects, to provide a machine of this character which will be operative for automatically taking continuous samples of a product from a continuous product flow during manufacture of concentrates, flour, sugar, salt, cement, or the like, or in the reduction of ores.

In sample cutting machines for the purposes above mentioned a principal requirement for accuracy is that the cutter, through which the sample must pass, shall have uniform motion as it travels through the entire cross section of the product stream. Another requirement for accuracy is that the cutter shall clear the product stream by an adequate margin at the end of each stroke of said cutter. Still another requirement is that the speed of the cutter, relative to the speed of the product stream, may be readily susceptible of adjustment, within limits, so that a definite portion or fraction of the entire product may be withdrawn for sampling. The degree of accuracy of the machine will be determined by the extent to which the sample taken by the machine is truly representative, by qualitative analysis, of the entire product.

Another object of the invention is, therefore, to provide an automatic sample cutting machine which will fulfill the requirements for accuracy hereinbefore set forth in a highly efficient manner.

A further object of the invention is to provide an automatic sample cutting machine which will be operated by the same source of power that causes flow of the stream of material or product to be sampled, with the result that maximum reliability, flexibility, economy and simplicity will be realized.

Still another object of the invention is to provide a machine of the type set forth which may be used in connection with product streams of various widths.

A further object of the invention is to provide an automatic sample cutting machine having improved means for imparting motion to the sample car and cutter employed.

And a still further object of the invention is to provide an automatic sample cutting machine wherein an improved and highly efficient sample car and cutter are employed.

Other objects of the invention, not mentioned hereinbefore, will become apparent during the course of the following description.

In the accompanying drawings:

Figure 1 is a top plan view of my automatic sample cutting machine.

Figure 2 is a side elevation thereof.

Figure 3 is a diagrammatic view.

Figure 4 is also a diagrammatic view.

In the drawings, like numerals of reference designate like parts. By referring to the drawings, it will be seen that my improved automatic sample cutting machine comprises two separate units, i. e., a sample car and cutter, and a unit including shifting mechanism for imparting reciprocatory movement to the car and cutter. For the sake of convenience, the car and cutter will first be described.

The sample car and cutter includes a track having spaced rails 1 which are positioned to pass beneath the upper, or discharge end, of a conveyor 2, said conveyor being adapted for discharging concentrates, ores, or the like. The discharge flow will, for convenience, be hereinafter designated as the product and indicated by the numeral 3. The rails are, of course, disposed at substantially right angles to the axis of the discharge conveyor and extend laterally with respect to the front of said conveyor. The rails are formed of channel iron or are of standard rail design.

The rails 1 movably support the sample car and cutter in such a manner that said sample car and cutter may be shifted back and forth beneath the conveyor 2. The sample car and cutter unit is indicated generally at 4. The car and cutter 4 includes a frame 5 which is substantially rectangular in shape. The frame 5 carries an axle 6 at each end, and journaled on the ends of the axles exteriorly of the frame 5 are flanged wheels 7 which are adapted to roll on the rails 1. The frame 5 includes front and rear rails 8 and 9 respectively, said rails being connected by side rails 10 and 11.

The sample car and cutter includes a cutter 12 which extends diagonally with respect to the frame. The cutter 12 is composed of substantially L-shaped cutter elements 13 and 14 which are arranged in parallel spaced relation to each other and have upstanding flanges 15. More specifically, the cutter 12 extends from the side rail 10, near the rear rail 9, to the side rail 11 near the front rail 8. This particular mounting for the cutter is highly important and will be discussed in more detail hereinafter. Connected with the cutter is a sample discharge chute 16, said chute extending beneath the cutter throughout its entire length and having its body positioned so that samples of the product flow 3 will be led to one side of the flow for convenient withdrawal.

The shifting mechanism for imparting reciprocatory movement to the sample car and cutter will now be described. For the sake of convenience and for reasons which will become apparent later in the description, I will refer hereinafter to said shifting mechanism as a motion transformer. The motion transformer is shown generally at 17 and includes a substantially rectangular case 18, said case having a bottom wall 19, end walls 20 and 21, and side walls 22 and 23. Mounting flanges 24 are carried on the side walls near their corresponding lower ends and provide means for anchoring the motion transformer to a suitable support. No particular supporting surface has been shown for the reason that said surface will vary in contour and formation with different applications of the invention.

The case 18 provides means for carrying the shifting mechanism proper. More specifically, a drive shaft 25 is mounted on the wall 22 near one end thereof and substantially medially of the height of the case. The drive shaft 25 carries a pulley 26 on its free end and said pulley is adapted for rotatable connection with a source of power, preferably the source of power which drives the conveyor 2. If desired, a direct connection may be made between the pulley 26 and a pulley on the conveyor. The shaft 25 is preferably formed of cold rolled steel and is journaled in a bearing 27 on the wall 22. The bearing 27 is, of course, lined with bronze or babbitt, in the conventional manner. A sprocket wheel 28 is mounted on the inner end of the shaft 25 within the case 18. With further reference to the pulley 26, it should be understood that, if desired, a sprocket wheel, pinion, or V-pulley may be substituted for said pulley 26. Mounted on the shaft 25 is an oil ring 29, the oil ring, of course, serving the purpose of lubricating the bearing 27 and the shaft 25.

Positioned within the case 18, on the wall 22 thereof, is an adjusting unit 30. The adjusting unit includes a guide bar 31 mounted in parallel spaced relation to the wall 22, medially of the height of said wall, by means of blocks 33 and 34. An adjusting screw 35 extends throughout the entire length of the guide bar 31 and is journaled for rotative movement. The adjusting screw is provided with a relatively large pitch thread. The adjusting screw extends through one end of the bar 31 and said projecting end is squared, as shown at 36, to receive a wrench or other tool. The adjusting screw extends through a sprocket mounting block 37, said sprocket mounting block being shiftable longitudinally within the confines of the bar 31 for a purpose to be set forth hereinafter. The sprocket mounting block 37 has an integral stub shaft 38, shown in dotted lines in Figure 1, and mounted to rotate on this stub shaft is an idler sprocket wheel 39. An oil ring 40 surrounds the hub of the wheel 39 and assures thorough lubrication. A nut 41' is screwed into the block 37 and provides means for locking the block in adjusted position.

It should be understood that the sprocket wheel 28 and the sprocket wheel 39 are mounted in longitudinal alinement in the case 18. Moreover, as will be seen, the sprocket wheels 28 and 39 are disposed substantially medially of the height and width of the case.

Trained about the sprockets 28 and 39 is a sprocket chain 41, said sprocket chain being of conventional formation, but having removable links in order that said chain may be lengthened or shortened, by the addition or removal of such links. The links of the chain 41 are indicated at 42 and are connected to each other by means of pins 43. However, in lieu of one of the pins 43, I provide a driving pin 44 which extends laterally toward the wall 23. A roller 45 is carried on the driving pin 44 and said roller is shiftable in the slot 46 of a driving head 47. As best seen in Figure 2, the driving head 47 is vertically disposed in the case and is substantially rectangular in shape. The driving head carries a roller 48 at its lower end, said roller being mounted on a bolt 49 which projects laterally from the driving head. The roller 48 is engageable with a track 50 mounted on the bottom wall 19 and extends longitudinally thereof for a distance of substantially three-fourths its length.

The driving head 47 is connected with the sample car and cutter by a connecting rod 51, said connecting rod extending through a bearing 52 in the end wall 21 of the case, said bearing being lined with babbitt or bronze. The connecting rod is operatively connected with the sample car and cutter by means of a coupling 53 which is mounted on the rail 9 substantially medially thereof. At its inner end, the connecting rod 51 is connected to the driving head, substantially medially of its height, by means of an integral coupling 54.

The case 18 is normally filled with lubricant to the depth indicated by the dotted lines in Figure 2. Also, a cover is preferably placed upon the case in order to seal the mechanism and thus prevent entry of dirt or the like.

The cover above mentioned is preferably made in two parts, an inner cover of glass being provided with a continuous dust and oil tight joint between it and the top of the case. The glass cover permits convenient inspection of the moving parts. The outer cover is hinged and is made of rugged steel construction affording protection for the inner glass cover. The outer cover is indicated at 55 and the inner cover at 56. These covers are shown fragmentarily, it being considered unnecessary to show them in further detail.

The operation of the invention is as follows. For the sake of simplicity, let it be assumed that, in Figure 2, the lines KO and LN are perpendicular lines through the sections of sprocket wheels 28 and 39 respectively. The line PM is a horizontal line drawn through the same sections. Rotary motion at a constant speed is applied to the shaft 25 from an external source of power. Preferably, the source of power is the same as that which drives the conveyor 2. The direction of rotation is as indicated by the arrow on the sprocket wheel 28. With constant revolutions per unit of time on the driving sprocket wheel 28, the pin 44 will make complete successive circuits through the points KLMNO and P. From K to L the horizontal displacement of the pin 44 and, and therefore, of the rod 51 and the sample car and cutter 4, will have uniform motion. Therefore, any portion of the displacement from K to L may be used for, let it be assumed, the forward stroke of the cutter. From L to M the horizontal displacement of the pin 44 will have smooth deceleration. At M, obviously, the horizontal displacement of the pin 44 will be zero. From M to N the horizontal displacement of the driving pin will have smooth acceleration and, of course, the horizontal motion of the pin 44 and the sample car and cutter will be reversed.

From N to O, the horizontal displacement of the pin 44 will have uniform motion. Therefore, movements of the pin from N to O will be used for the return stroke of the cutter. As in the case of movement from L to M, the movement from O to P will effect smooth deceleration of the pin 44. At P the horizontal displacement of the pin 44 and, of course, the sample car and cutter, will be again zero. From P to K the horizontal displacement will be again reversed in direction and will have smooth acceleration. At K the driving pin has made one complete circuit and the sample car and cutter has made one forward and one return stroke through the product stream. As long as rotary motion is applied to the shaft 25, the motion transformer will function to produce forward and return strokes of the sample car and cutter. The general characteristic and advantage of the arrangement shown and described is that of uniform motion. More specifically, it is believed that, in the construction set forth, the ideal medium for actuating the sample car and cutter in a sample cutting machine is provided, both from a mechanical standpoint and from a metallurgical or other standpoint, depending upon the nature of the product to be sampled. First, the highly essential characteristic of uniform motion of the sample car and cutter as it traverses the product stream, is positively and simply obtained. This contrasts with other systems which depend upon some separate source of power, electric or hydraulic, for example. This feature greatly increases the dependability of my sample cutting machine. Second, the motion transformer is a balanced mechanical unit, having both static and running balance at all times. This feature assures smooth operation and long life to all parts. Third, as hereinbefore set forth, my motion transformer affords smooth, gradual acceleration at the beginning of each stroke and smooth, gradual deceleration to zero at the end of each stroke. The advantage for this construction is that severe strains on all parts of the apparatus will be eliminated. My improved motion transformer is extremely flexible in use. That is to say, by removing or adding, as the case may require, one or more links of the roller chain, the length of the stroke may be quickly and conveniently changed to meet the mechanical and metallurgical conditions of any sampling station throughout any one particular plant. It should be understood, of course, that when links are added to or removed from the sprocket chain 42, the sprocket 39 must be adjusted along the guide bar 31, which adjustment is accomplished by rotating the screw 35. The motion transformer has another particularly meritorious feature in that it is of compact design. That is to say, all moving parts are contained in an enclosing case. The parts are completely and effectively self-lubricating.

For the purpose of discussing the operation of the sample car and cutter, it will be assumed that the machine is to be used for the sampling of ores. As heretofore stated, however, my improved automatic sampling machine may be used just as effectively in any continuous process plant where automatic sampling of the product is desired. In my sample cutting machine, the sample car, which mechanically supports the cutter 12 and the chute 16, is so located that the reciprocating motion of the car on the track has a direction which is at right angles to the direction of motion of the ore stream as it moves with the conveyor. In other words, the cutter traverses the width of the ore stream rather than the thickness thereof. For purposes of clarity, let it be assumed for the moment that the cutter itself is located with its axis at right angles to the track. Looking at the face of the ore stream as it falls from the conveyor to the sample cutter, the segment of ore which passes through the cutter will have approximately the shape shown at A in Figure 3.

With the parallel direction of the cutter, an approximate relative segment of ore cut by the cutter would appear as shown at B in Figure 4. From a metallurgical point of view, it is important to note the distinction between the examples because the segment of ore cut by the machine of my invention is more truly representative of the entire shipment of ore. This claim is based on the well known fact that the fine particles in a shipment of ore will show material differences in assay values from the assay values of a large boulder in the same shipment. As the original fine particles in the ore and the particles resulting from the crushing of large rock are fed onto the conveyor carrying the resulting product to the sample cutting machine, the cross section of the ore stream composed of the crushed boulder particles alone, or in the majority, is not likely to be approximately close to a true representation of an entire shipment. A segment of ore cut by my improved machine must, therefore, be more truly representative because the longer segment has a much greater chance of including original fine particles and also particles which were parts of a boulder.

The second improvement in the sample car and cutter is obtained by placing the axis of the cutter opening in an angular position with respect to the direction of the product stream as it moves forwardly on the conveyor 2. In my machine, this angular displacement is approximately forty-five degrees because I consider this position to give the optimum results from a metallurgical standpoint. To prove that this angular position of the cutter will still further make the segment of ore more truly representative of the whole, reasoning identical with that discussed in connection with the cross motion of the cutter will hold.

It is believed that the construction, operation and advantages of my invention will be fully understood from the foregoing description.

Having thus described the invention, what is claimed is:

1. In an automatic sampling machine, a sample car, a sampling chute carried by the car, spaced diagonally disposed cutters mounted on the car and forming the entrance to the sampling chute for movement diagonally through the path of a product flow, and means for imparting reciprocatory movement to the sample car.

2. In an automatic sampling machine, a track disposed beneath a conveyor, a sample car mounted for travel on the track and provided with a sampling chute, a sample cutter mounted on the car and including spaced cutter elements forming the entrance to said chute, said spaced cutter elements being arranged diagonally with respect to the chute entrance whereby the cutter elements will be disposed at an angle with respect to a product stream, and means for moving the sample car and cutter back and forth through the product stream.

3. In a sampling machine as recited in claim 2; wherein the sample car is provided with a frame and a chute depends therefrom for leading a sample of the product stream to a position for convenient withdrawal.

4. In an automatic sampling machine, a sample car provided with a sampling chute, spaced cutters mounted on the car over the entrance to said chute for removing a sample from a product stream, said cutters being disposed at an angle to the chute entrance for assuring removal of a sample which will be representative of the product stream, a motion transformer, means operatively connecting the motion transformer with the sample car, and means for imparting rotative movement to the motion transformer, said motion transformer imparting reciprocatory movement to the sample car and cutter.

5. In an automatic sampling machine, a sample car including a frame and depending sampling chute, spaced cutters mounted on the frame over the entrance to the sampling chute, said cutters being disposed at an angle of substantially forty-five degrees with respect to the length of the sample car and at substantially a right angle with respect to the flow of a product stream.

THOMAS JORDAN.